US007039898B2

(12) United States Patent
Shah

(10) Patent No.: US 7,039,898 B2
(45) Date of Patent: May 2, 2006

(54) COMPUTER SYSTEM FOR PERFORMING REUSABLE SOFTWARE APPLICATION DEVELOPMENT FROM A SET OF DECLARATIVE EXECUTABLE SPECIFICATIONS

(75) Inventor: Shahid N. Shah, Silver Spring, MD (US)

(73) Assignee: Netspective Communications, LLC, Lanham, MD (US)

( * ) Notice: Subject to any disclaimer, the term of this patent is extended or adjusted under 35 U.S.C. 154(b) by 579 days.

(21) Appl. No.: 10/194,646

(22) Filed: Jul. 12, 2002

(65) Prior Publication Data

US 2004/0010776 A1    Jan. 15, 2004

(51) Int. Cl.
*G06F 9/44* (2006.01)
(52) U.S. Cl. ...................................................... 717/107
(58) Field of Classification Search ................ 717/103, 717/106–109, 116–117, 120–124, 127; 707/3–4, 707/100, 200
See application file for complete search history.

(56) References Cited

U.S. PATENT DOCUMENTS

| 5,673,199 A | 9/1997 | Gentry ........................ 364/490 |
| 5,764,226 A | 6/1998 | Consolatti et al. ........... 345/333 |
| 6,028,997 A * | 2/2000 | Leymann et al. ............ 717/104 |
| 6,370,682 B1 * | 4/2002 | Eckardt et al. .............. 717/141 |
| 2002/0069399 A1 * | 6/2002 | Miloushey et al. .......... 717/108 |
| 2004/0205692 A1 * | 10/2004 | Robinson ..................... 717/100 |

* cited by examiner

*Primary Examiner*—Wei Y. Zhen
*Assistant Examiner*—Mary Steelman
(74) *Attorney, Agent, or Firm*—Gibb I.P. Law Firm, LLC; Mohammad S. Rahman, Esq.

(57) ABSTRACT

A computer system executing a method for performing reusable software application development comprises integrating a data processing system, providing a set of keywords and attributes, and declaring a set of executable specifications using the keywords and attributes, further comprising generating a program code, instantiating an object code, generating a testable functionality result, generating at least one unit test, generating an implementation documentation output, generating a performance statistics output, and generating a project metrics in the data processing system. The step of providing a set of keywords and attributes comprises generating a set of user interface forms, fields, and validation rules, generating a library of structured query language statements, generating a library of rules for generating dynamic structured query language statements, generating one of a web browser report, a file-based report, and a portable document format report, generating a library of security rules and permission statements, and generating database schemata.

19 Claims, 10 Drawing Sheets

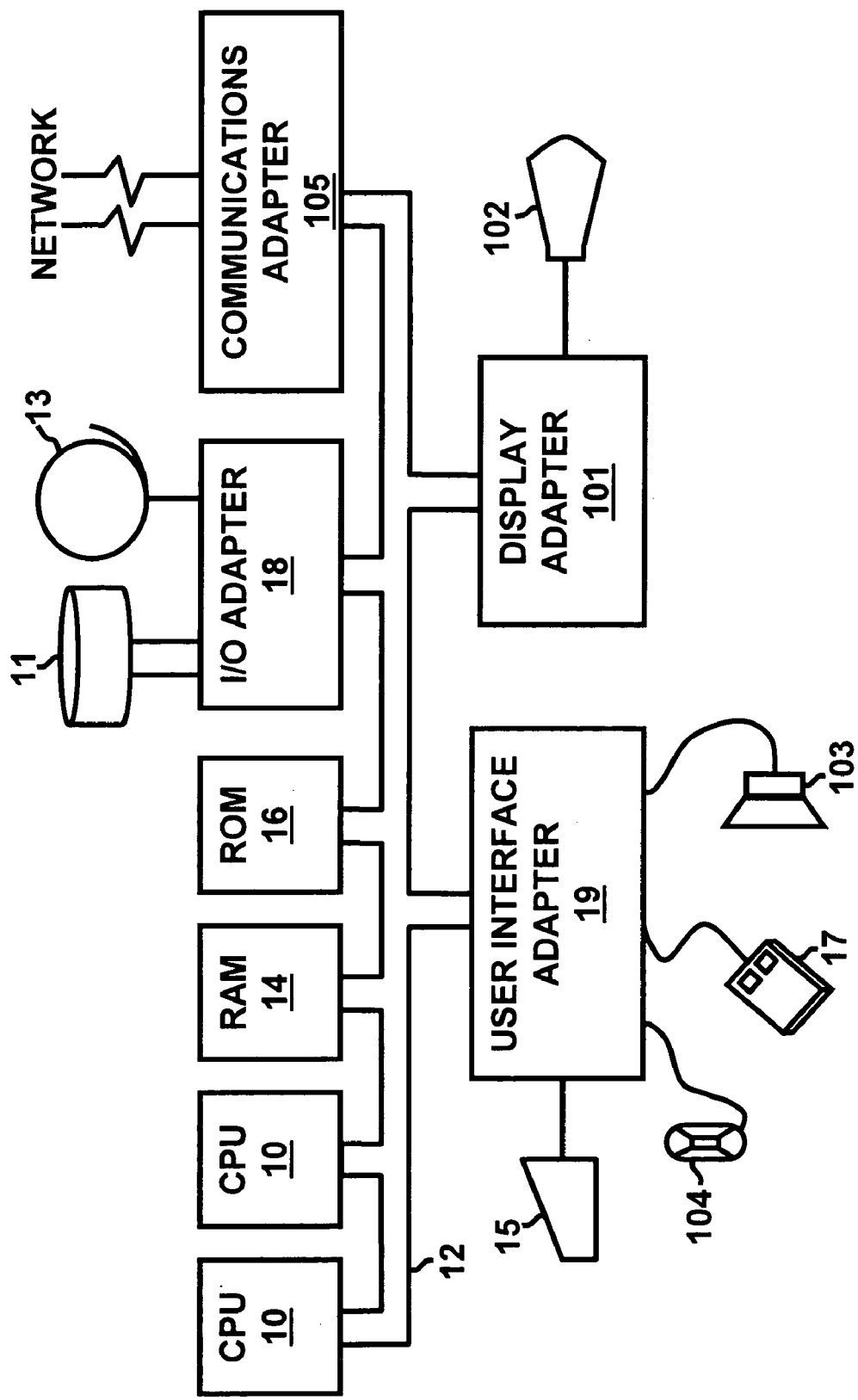

COMPUTER SYSTEM FOR PERFORMING REUSABLE SOFTWARE APPLICATION DEVELOPMENT FROM A SET OF DECLARATIVE EXECUTABLE SPECIFICATIONS

BACKGROUND OF THE INVENTION

1. Field of the Invention

The present invention generally relates to reusable software application development systems and methods, and more particularly to a computer system for performing reusable software application development from a set of declarative executable specifications.

2. Description of the Related Art

For several years computer software applications have been written to improve the productivity of individuals inside an enterprise, such as a company or firm. Even from the early days of computers, software applications have been developed to provide faster payroll processing, improved record-keeping, management of sales, and increase the speed of research and development. With these so-called internal applications in place for decades, studies indicate that enterprises have been able to significantly improve employee productivity.

Moreover, since the advent and widespread use of the Internet and the World Wide Web ("the Web"), there has been a desire by the management in these enterprises to extend their internal application functionality and technology infrastructure to external parties, such as their customers, partners, vendors, suppliers, and other constituents. For example, instead of a salesperson taking an order over the telephone and then entering that order into the internal company sales software application, enterprises are now allowing their own constituents to create orders directly into their internal applications by allowing access to the enterprise's systems through the Web. This is called extending the enterprise.

Over time, enterprises have discovered that the more they extend their internal infrastructures to external parties, the better return on their investment of their infrastructure. Furthermore, extending the enterprise now refers to the rapid creation of simple or complex applications that connect to legacy and existing systems and allow customers, suppliers, vendors, partners, and all constituents to transact business with an enterprise at reduced cost by directly accessing an enterprise's internal computer system(s). This form of application development, which is referred to as an Internet or Web development, has new engineering challenges including security, quality, and maintenance. Developments in Internet software have surfaced in several different areas ranging from on-line shopping and banking to collaborative research and instant messaging. Web-based tools have helped to partially bridge the gap between the Web pages of the early Web and sophisticated Internet-based applications. However, while significant progress has been made in the development of Internet applications, conventional application development tools for the Internet still have many shortcomings, especially for the mission-critical use that most Web applications are now deployed.

Moreover, existing development environments and languages treat the problem domains of specifications, design, testing, coding, runtime evaluation, and implementation documentation separately. With conventional tools, prototyping, creating functional specifications, design, testing, coding, execution, and documentation are usually performed by different groups from different disciplines within an enterprise. However, by failing to provide a unified system and methodology from which a single set of declarative commands can create specifications, documentation, testable components, and executable code, conventional systems often require more work to be performed, utilizing more experienced and higher number of human resources, and often resulting in multi-component software integration that produces lower quality software. While existing development environments provide for some reuse within an application, they simply fail to allow for reuse across applications and projects. For instance, some components can be shared and reused within an application in these conventional environments. However, across projects, reusing the same components becomes difficult or impossible due to the design of conventional development environments and architectures.

While the conventional development processes once provided a valuable system of creating multi-components of business systems, there remains a need for a new automated reusable software application development system which provides a uniform framework for describing the various components or facets of business systems using simple declarative constructs that even inexperienced programmers can create and yet achieve quality attributes of systems that senior level architects and engineers often produce.

SUMMARY OF THE INVENTION

In view of the foregoing, and other drawbacks and disadvantages of the conventional systems, the present invention has been devised, and it is an object of the present invention, to provide an automated system and method for performing reusable software application development. It is another object of the present invention to provide a business-oriented computer software system comprising multi-components or facets including forms, dialogs, fields, validation rules, static structured query language statements (SQL), dynamic structured query language statements, security roles and permissions, value sources, data sources, database schemata, reports, navigation, and personalization.

It is yet another object of the present invention to provide a unified system of processing, testing, and documenting these facets. Still another object of the present invention is to provide a computer system and method for automatically generating and processing software code, object instantiations, testable functionality, and implementation documentation from a single set of declarative executable specifications. Yet another object of the present invention is to provide a computer system that allows a software application developer the ability to declare a single set of executable specifications and receive full unit tests, implementation documentation, and end-user application code from the set of specifications. Another object of the present invention is to provide a computer system for performing software application development that allows the executable specifications to be reused across several projects.

In order to attain the objects suggested above, there is provided, according to one aspect of the invention, a computer system for performing reusable software application development comprising a multi-component architecture, which comprises data, wherein the multi-component architecture further comprises a relational database server operatively connected to an application server, a presentation component operatively connected to the application server, an application component operatively connected to the application server, a data component operatively connected to the application server, a security and personalization component operatively connected to the presentation component, the application component, and the data component, and wherein the computer system also comprises an administration console operatively connected to the presentation component, the application component, and the data component, wherein the administration console comprises the security and personalization component, and wherein the security and personalization component restricts access to the data.

The multi-component architecture further comprises declarable executable specifications, wherein the declarable executable specifications further comprise a set of keywords and attributes used to declare the executable specifications. Moreover, the presentation component comprises an extensible application framework comprising at least one application program interface, wherein the application program interface automates form building engines, data state machine engines, queries engines, reporting engines, templating engines, access control engines, project configuration engines, rule processing engines, and metrics engines.

Additionally, the application component comprises an extensible information framework of libraries, wherein the libraries comprise reusable tables, columns, and indexes. Furthermore, the data component creates a plurality of database object classes, wherein the data component comprises data types, table types, tables, and enumerations. Moreover, the administration console responds to operator commands enabling an operator to access the data and the declarable executable specifications.

Additionally, there is provided, according to the present invention, a method for performing reusable software application development, wherein the method comprises integrating a data processing system, providing a set of keywords and attributes in the data processing system, and declaring a set of executable specifications using the set of keywords and attributes. The step of declaring a set of executable specifications comprises generating a program code in the data processing system, instantiating an object code in the data processing system, generating a testable functionality result in the data processing system, generating at least one unit test case in the data processing system, generating an implementation documentation output in the data processing system, generating a performance statistics output in the data processing system, and generating a project metrics in the data processing system.

The step of providing a set of keywords and attributes comprises generating a set of user interface forms, fields, and validation rules, wherein the method enables an operator to describe components of a presentation and interface by receiving input from a user. Furthermore, the step of providing a set of keywords and attributes comprises generating a library of structured query language statements, and generating a library of rules for generating dynamic structured query language statements, wherein the method enables an operator to describe database access components by retrieving data from a data storage device, wherein the data storage device is coupled to the data processing system, and wherein the method enables the operator to describe database access rules and user interface components that connect to the data storage device by retrieving the data from the data storage device and presenting the data to a user.

Additionally, the step of providing a set of keywords and attributes comprises generating one of a web browser report, a file-based report, and a portable document format report, wherein the method enables an operator to describe database interface components by displaying data to a user. Also, the step of providing a set of keywords and attributes comprises generating a library of security rules and permission statements, wherein the method enables an operator to describe authorization and authentication components of an application. Finally, the step of providing a set of keywords and attributes comprises generating database schemata, wherein the database schemata comprises data types, table types, tables, and enumerations, wherein the method enables an operator to describe database structure components by storing application data.

Additionally, according to the present invention, a program storage device readable by machine, tangibly embodying a program of instructions executable by the machine to perform the above-described method for performing reusable software application development is disclosed.

There are several benefits of the present invention. First, the present invention provides an automated system and method for performing reusable software application development. Second, the present invention provides a business-oriented computer software system comprising multi-components or facets including forms, dialogs, fields, validation rules, static structured query language statements, dynamic structured query language statements, security roles and permissions, value sources, data sources, database schemata, reports, navigation, and personalization. Another benefit of the present invention is that it provides a unified system of processing, testing, and documenting these facets.

Yet another benefit of the present invention is that it provides a computer system and method for automatically generating and processing software code, object instantiations, testable functionality, and implementation documentation from a single set of declarative executable specifications. Still another benefit of the present invention is that it provides a computer system that allows a software application developer the ability to declare a single set of executable specifications and receive full unit tests, implementation documentation, and end-user application code from the set of specifications. Another benefit of the present invention is that it provides a computer system for performing software application development that allows the executable specifications to be reused across several projects.

Moreover, another benefit of the present invention is that it provides a computer system and methodology which allows application developers to spend time on real features significant to end-users instead of infrastructure issues that are important only to programmers. Furthermore, another benefit of the present invention is that it provides a computer system whereby technical managers can better manage their application development projects by utilizing built-in project management, application documentation, unit-testing, and artifact-generation tools. Additionally, another benefit of the present invention is that most of the user interface and database logic is coded in a declarative style using XML code instead of a programmatic style using Java code, wherein this significantly reduces the amount of code (as much as 50–75% of code can be eliminated), increases reusability of the code, and increases code quality.

Yet another benefit of the present invention is that it provides a computer system, wherein analysts can use the declarative user interface features to create prototypes that can later be completed by programmers, thereby resulting in no more throw-away prototypes, as is common with conventional systems. Still another benefit of the present invention is that it provides a computer system, wherein applications are built by assembling declared user interface (UI) forms/dialogs and database SQL components combined with application-specific business logic using single or multiple distributed application tiers. Another benefit of the present invention is that it provides a feature-rich framework that significantly reduces the time, resources, and cost of producing reusable high-quality data-intensive thin-client applications.

Yet another benefit of the present invention is that it implements common design patterns like Model-View-Controller (MVC) and factories, and the present invention's skins infrastructure allows identical business logic to be used across different user interfaces for a variety of browsers and platforms like handheld computers. Still another benefit of the present invention is that it affords developers much flexibility in their software application development process without having to change the existing code-base.

BRIEF DESCRIPTION OF THE DRAWINGS

The foregoing and other objects, aspects and advantages will be better understood from the following detailed description of a preferred embodiment(s) of the invention with reference to the drawings, in which:

FIG. 14 is a system diagram according to the present invention.

DETAILED DESCRIPTION OF PREFERRED EMBODIMENTS OF THE INVENTION

As previously mentioned, there is a need for a new automated reusable software application development system capable of streamlining and improving the technique of software application development. The claimed invention addresses this need by providing a system and method for performing reusable software application development from a set of declarative executable specifications. Specifically, the present invention provides a system for easily assembling robust and sophisticated business applications from a set of reusable declarative constructs, and from these constructs known as executable specifications, to automatically generate program code, automatically instantiate objects that do not need to be recompiled, automatically generate unit test cases to enforce quality standards, and to automatically generate implementation documentation that can be used for application maintenance.

Figure 1:
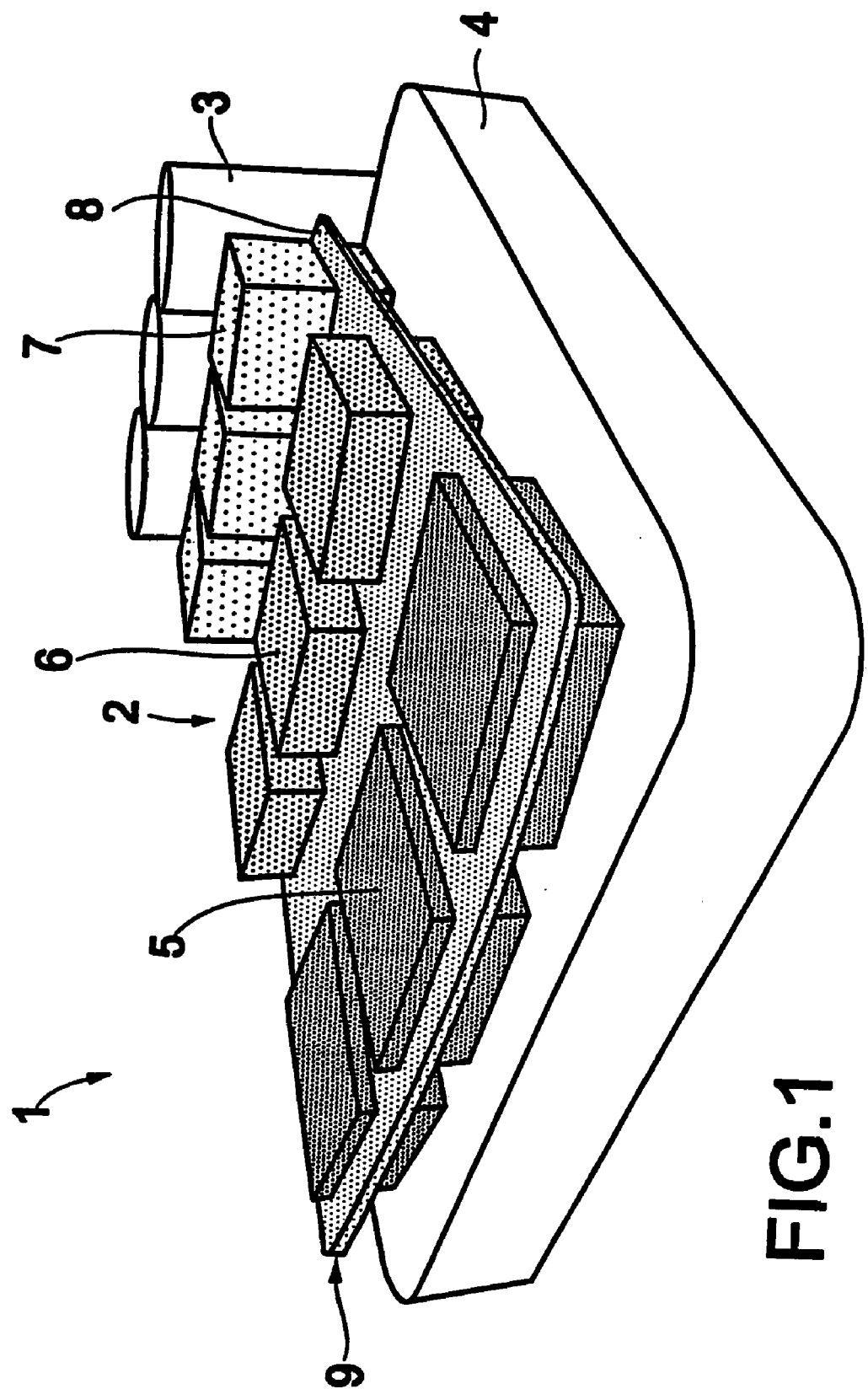
FIG. 1 is a system diagram illustrating a preferred embodiment of the present invention.

Referring now to the drawings, and more particularly to FIGS. 1 through 14, there are shown preferred embodiments of the system and method according to the present invention. Specifically, in FIG. 1, there is shown a system diagram illustrating a preferred embodiment of the present invention in which a computer system 1 for performing reusable software application development is shown comprising a multi-component architecture 2, which comprises data 37 (shown in FIG. 6), wherein the multi-component architecture 2 further comprises a relational database server 3 operatively connected to an application server 4, a presentation component 5 operatively connected to the application server 4, an application component 6 operatively connected to the application server 4, a data component 7 operatively connected to the application server 4, a security and personalization component 8 operatively connected to the presentation component 5, the application component 6, and the data component 7, and wherein the computer system 1 also comprises an administration console 9 operatively connected to the presentation component 5, the application component 6, and the data component 7, wherein the administration console 9 comprises the security and personalization component 8.

Figure 2:
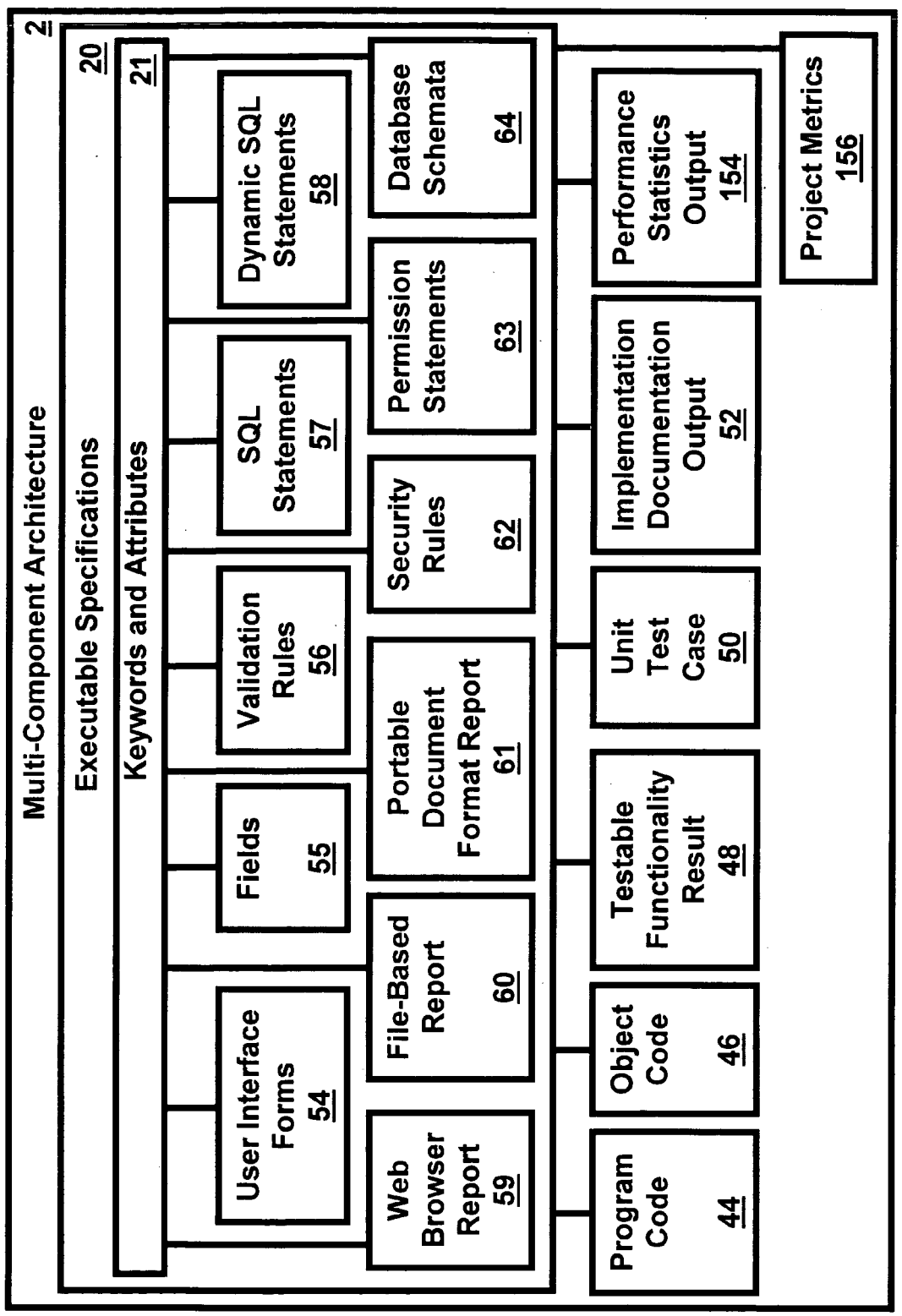
FIG. 2 is a system diagram illustrating a preferred embodiment of the present invention.
Figure 3:
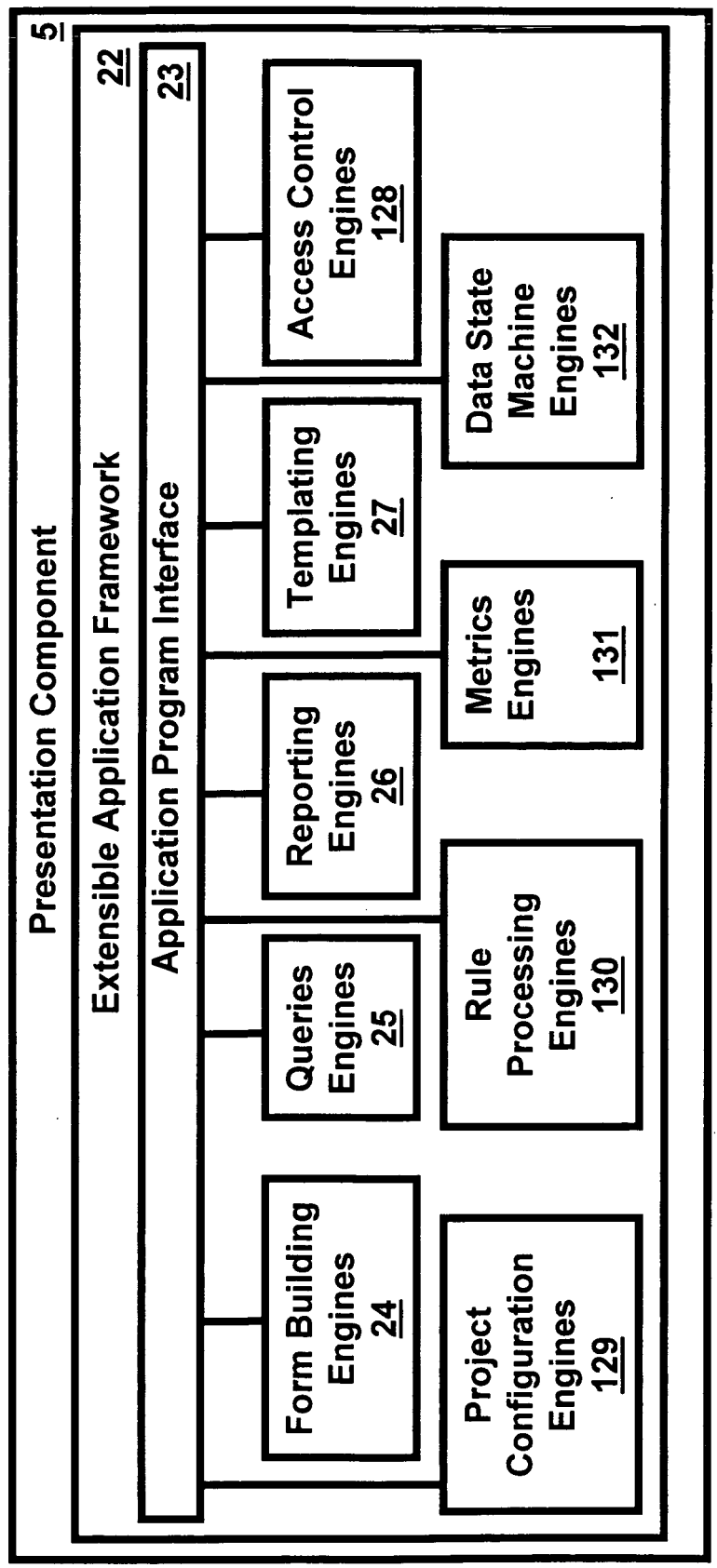
FIG. 3 is a system diagram illustrating a preferred embodiment of the present invention.

Next, as shown in the systems diagram of FIG. 2, the multi-component architecture 2 further comprises declarable executable specifications 20, wherein the declarable executable specifications 20 further comprise a set of keywords and attributes 21 used to declare the executable specifications 20. Moreover, as seen in the systems diagram of FIG. 3, the presentation component 5 comprises an extensible application framework 22 comprising at least one application program interface 23, wherein the application program interface 23 automates form building engines 24, data state machine engines 132, queries engines 25, reporting engines 26, templating engines 27, access control (security) engines 128, project configuration engines 129, rule processing engines 130, and metrics engines 131. Engines 24, 25, 26, 27, 128, 129, 130, 131, 132 are provided for ready-to-run data-driven application functionality, which programmers do not need to code themselves. Without these engines 24, 25, 26, 27, 128, 129, 130, 131, 132 each programmer would be required to create their own programs that ran forms, queries, reports, and markup languages.

Specifically, the form building engine 24 creates, processes, manages, and tracks all of the user interface components associated with forms and dialogs (user input). The queries engine 25 creates, processes, manages, and tracks all of the static and dynamic queries used to retrieve and store data from and to a data storage device like a relational database. The reporting engine 26 creates, processes, manages, and tracks all of the user interface components associated with displaying data retrieved from a data storage device like a relational database to a user (output). The templating engine 27 creates, processes, manages, and tracks all of the user interface components associated with displaying custom data (like web pages, graphics, etc) to a user (output). The access control engine 128 creates, processes, manages, and tracks all components associated with securing access to all user interface, database management, and business components. The project configuration engine 129 creates, processes, manages, and tracks all components associated with specifying configuration and environment data to an application (such as where components are located, what they are called, how they should be called, etc.).

Figure 4:
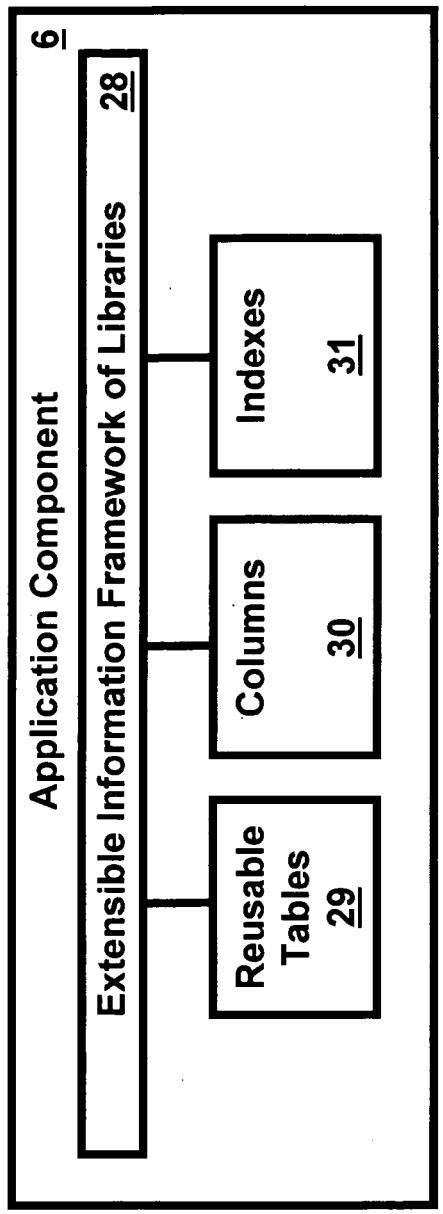
FIG. 4 is a system diagram illustrating a preferred embodiment of the present invention.
Figure 5:
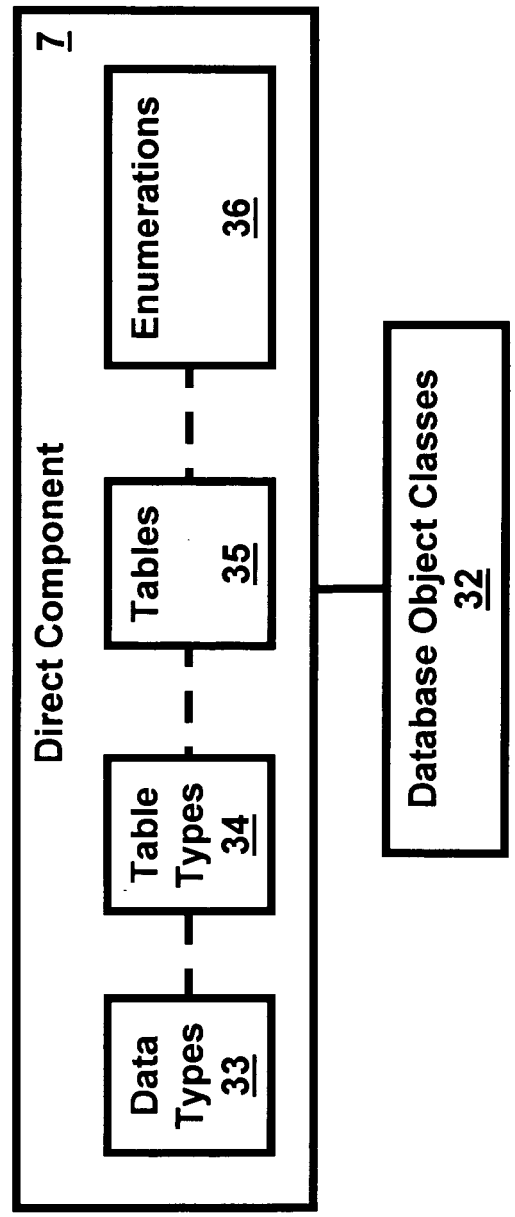
FIG. 5 is a system diagram illustrating a preferred embodiment of the present invention.

Next, the application component 6 comprises an extensible information framework of libraries 28, wherein the libraries 28 comprise reusable tables 29, columns 30, and indexes 31, which is further shown in the systems diagram of FIG. 4. These existing tables, columns, and indexes represent common storage requirements such as people, organizations, relationships, catalogs, price sheets, and such. Without providing these table and column components, programmers would be required to create their own relational data models with no templates to start from. Additionally, as illustrated in the systems diagram of FIG. 5, the data component 7 creates a plurality of database object classes 32, wherein the data component 7 comprises data types 33, table types 34, tables 35, and enumerations 36. These data components provide the ability for programmers to inherit behavior from existing databases and relational models without duplicating functionality.

Figure 6:
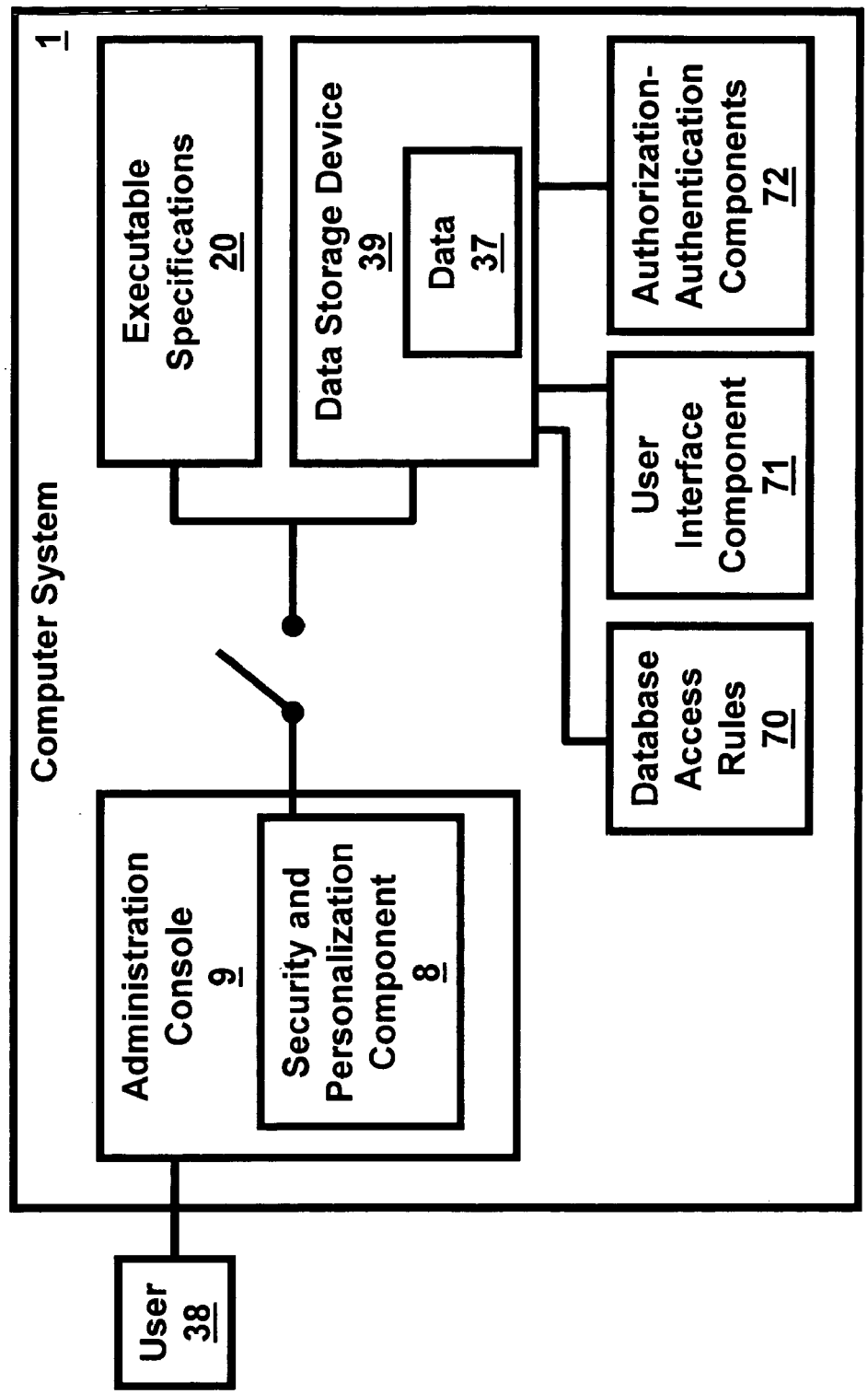
FIG. 6 is a system diagram illustrating a preferred embodiment of the present invention.

As depicted in the systems diagram of FIG. 6, the security and personalization component 8 restricts access to the data 37. The security and personalization component 8 of the computer system 1 restricts access to forms, reports, pages, and other resources based on user names, types, location, roles, capabilities, or other developer-defined permissions. With security and other features, all extensible application framework 22 applications support personalization features that allow applications to respond differently to different users based on location, user type, or user names.

Also, as shown in the systems diagram of FIG. 6, the administration console 9 responds to operator commands enabling an operator 38 to access the data 37 and the declarable executable specifications 20. Preferably, the administration console 9 is a browser-based interface. According to the present invention, instead of having to create functional specifications and other implementation documentation manually, such as with convention systems, the administration console 9 automatically documents (preferably using XML, also known as the eXtensible Markup Language, definitions and XSLT, also known as eXtensible Style Language Transformation style sheets) all of the forms (web dialogs), SQL statements, schema objects, and other programming artifacts in a centralized browser-based interface 9.

Furthermore, according to the present invention, the administration console 9 automatically provides browser-based testing of the forms and statements. Moreover, code such as Servlets or Java Server Pages (JSPs) does not need to be written for basic testing of forms, validations, and SQL statements. This is an advantage of the present invention because key functionality for most applications resides in JSPs and Servlets and being able to test them without having to write harnesses and other "test environments" significantly reduces development time and increases application/code quality. Additionally, once initial testing is completed all requirements are solidified, thereafter the forms and statements can be aggregated to create interactive applications. Thus, end users can use the interactive testing tools to see code as it is being developed.

According to the present invention, the administration console 9 automatically maintains basic application metrics as developers create forms, SQL statements, query definitions, JSP, servlets, and other code. The present invention not only captures the metrics, but also stores them in, preferably, XML files so that they can be analyzed over time. According to the present invention, metrics are advantageous in a reusable framework because they help measure the lines of code, size of components, number of files, engineering work performed, and complexity of projects. Without metrics to properly measure projects and compare them with other projects, managers and developers will not be able to improve the development process or code quality.

The extensible application framework 22 provides a log output that the administration console 9 tracks for maintaining data about execution statistics for SQL statements, servlet and JSP pages, dialogs/forms, and security, thereby tracking application performing and logging results. Furthermore, according to the present invention, the administration console 9 provides a centralized location for all project documentation for any application. Instead of storing application code and programmer documentation separately, the administration console 9 brings tag documentation and other project documents into a single and easily accessible place, thereby significantly reducing time in the software development process.

Figure 7:
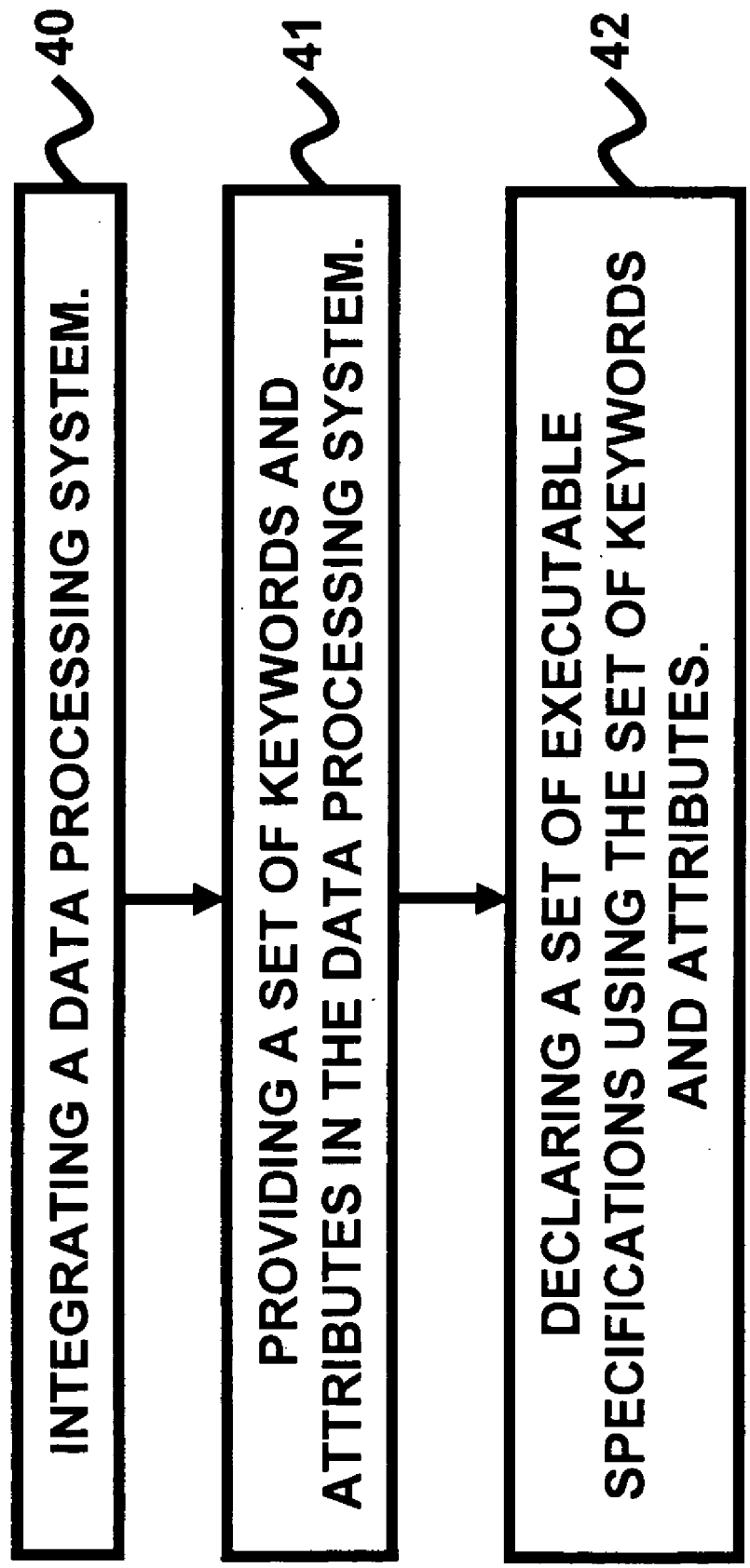
FIG. 7 is a flow diagram illustrating a preferred method of the present invention.
Figure 8:
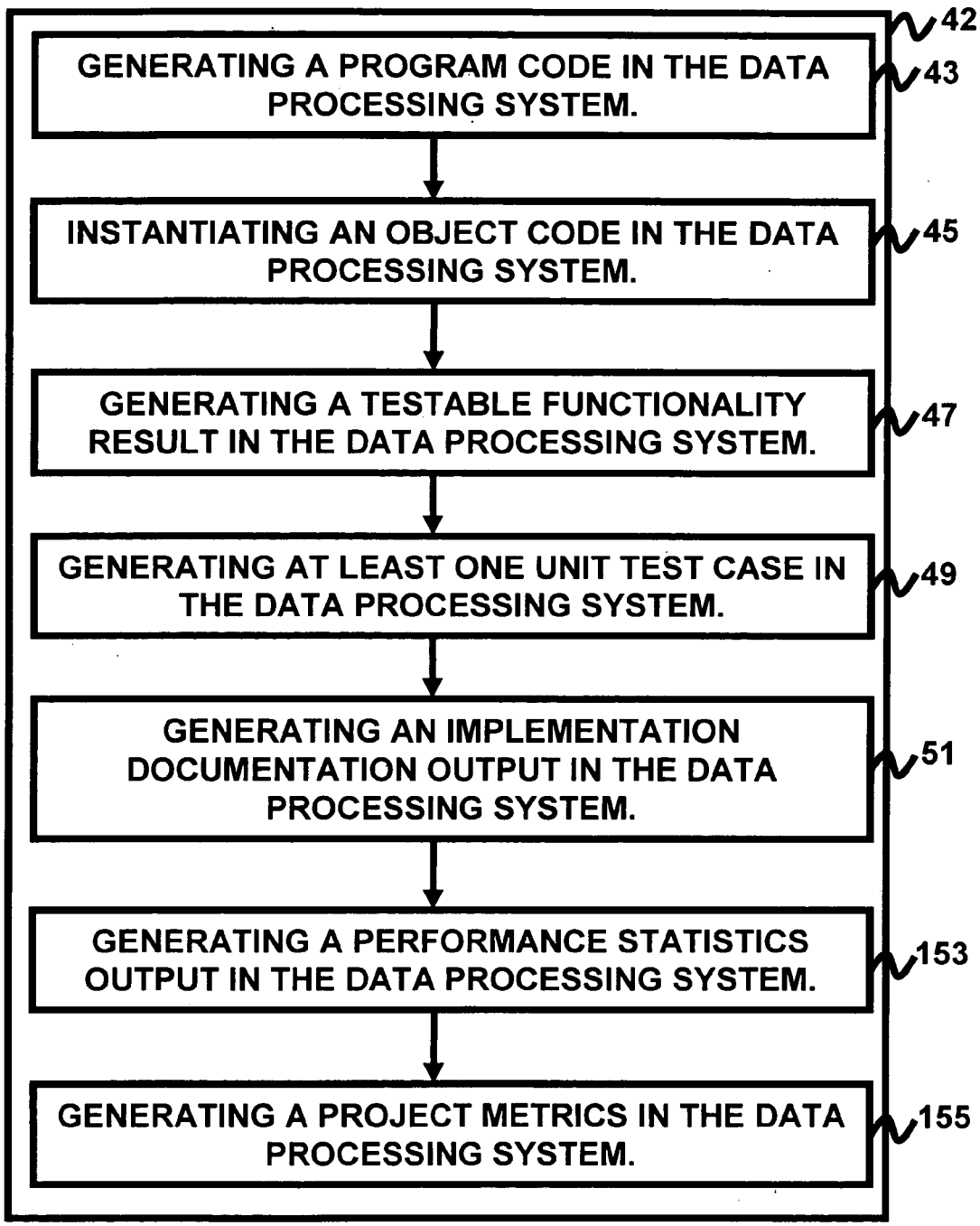
FIG. 8 is a flow diagram illustrating a preferred method of the present invention.

Additionally, there is provided, according to the present invention, a method for performing reusable software application development, as indicated in FIG. 7, wherein the method comprises first integrating 40 a data processing system 1. The next step involves providing 41 a set of keywords and attributes 21 in the data processing system 1. The final step involves declaring 42 a set of executable specifications 20 using the set of keywords and attributes 21. The system diagram of FIG. 2 and the flow diagram of FIG. 8 illustrate the various aspects of the executable specifications 20. The step of declaring 42 a set of executable specifications 20 comprises generating 43 (shown in FIG. 8) a program code 44 (shown in FIG. 2) in the data processing system 1, instantiating 45 an object code 46 in the data processing system 1, generating 47 a testable functionality result 48 in the data processing system 1, generating 49 at least one unit test case 50 in the data processing system 1, generating 51 an implementation documentation output 52 in the data processing system 1, generating 153 a performance statistics output 154 in the data processing system 1, and generating 155 a project metrics 156 in the data processing system 1.

The program code 44 is a set of actual program code that is generated. The program code 44, which the present invention produces, allows the programmer to view, modify (if needed), and compile it to object code. Furthermore, the program code 44 does not need to be maintained or modified by a programmer thereby saving time, reducing the number of engineers required, and increasing quality because it is known to be correct.

The object code 46 is directly used by the present invention to feed into the forms engines 24, query engines 25, report engines 26, templating engines 27, access control (security) engines 128, project configuration engines 129, rule processing engines 130, and metrics engines 131. This object code 46 is preferably direct binary code that is neither maintained nor modified by a programmer, thereby saving time, reducing the number of engineers required, and increasing quality.

The testable functionality result 48 allows the program code 44 and object code 46 to be automatically tested by a programmer. This saves a great deal of time in not having to prepare test code, reduces the requirements for test engineers, and increases quality. The unit test case 50 is a set of test scripts that allows the testable functionality result 48 to be automatically tested by a programmer without creating test harnesses or their own scripts. This saves a great deal of time in not having to prepare test scripts, reduces the requirements for test engineers, and increases quality.

The implementation documentation 52 is a set of documents describing forms, queries, reports, access control elements, and other inputs to the engines. The implementation documentation 52 is a set of documents used by programmers during the design, implementation, testing, and maintenance phases of software development. For example, the implementation documents 52 comprise functional specification of user interface components, specification and design of validation logic, specification of business rules, database design documents, database schema and structure definitions, static query specifications, dynamic query rules documents, access control and security descriptions, descriptions of object factories, and documents describing object repositories.

The performance statistics 154 provides an automated set of statistics that show the performance (speed of execution, number of executions, etc.) of user interface components, validation rules, access control items, static queries, dynamic queries, reports, and other inputs to the engines. The project metrics 156 aid in measuring the lines of code, size of components, number of files, engineering work performed, and complexity of the projects. Without metrics 156 to properly measure a project and compare them with other projects, managers and developers will not be able to improve the development process or code quality.

Figure 9:
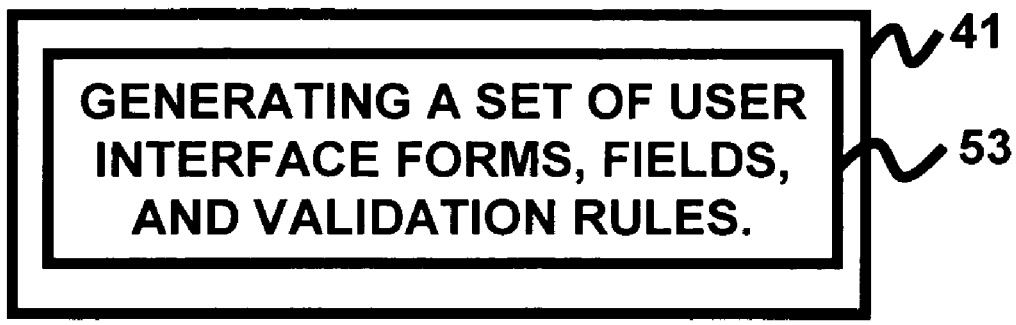
FIG. 9 is a flow diagram illustrating a preferred method of the present invention.
Figure 10:
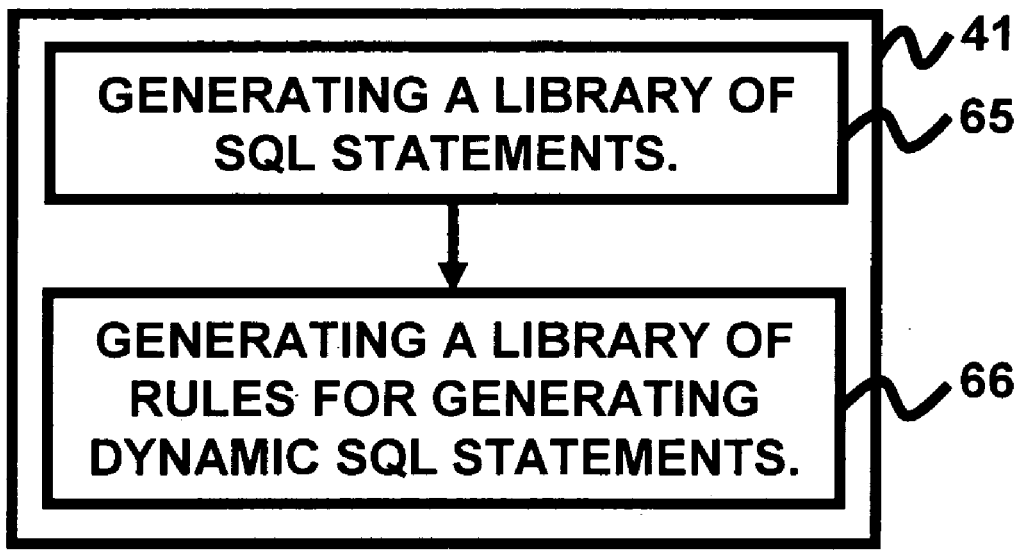
FIG. 10 is a flow diagram illustrating a preferred method of the present invention.

Next, as graphically illustrated in the flow diagram of FIG. 9, the step of providing 41 a set of keywords and attributes 21 comprises generating 53 a set of user interface forms 54 (shown in FIG. 2), fields 55 (shown in FIG. 2), and validation rules 56 (shown in FIG. 2), wherein the method enables an operator 38 to describe components of a presentation and interface (not shown) by receiving input 38 from a user 38. Furthermore, as shown in the flow diagram of FIG. 10, the step of providing 41 a set of keywords and attributes 21 comprises generating 65 a library of structured query language statements 57 (shown in FIG. 2), and generating 66 a library of rules for generating dynamic structured query language statements 58 (shown in FIG. 2), wherein the method enables an operator 38 to describe database access components 2 by retrieving data 37 from a data storage device 39 (shown in FIG. 6), wherein the data storage device 39 is coupled to the data processing system 1, and wherein the method enables the operator 38 to describe database access rules 70 and user interface components 71 that connect to the data storage device 39 by retrieving the data 37 from the storage device 39 and presenting the data 37 to a user 38.

Figure 11:
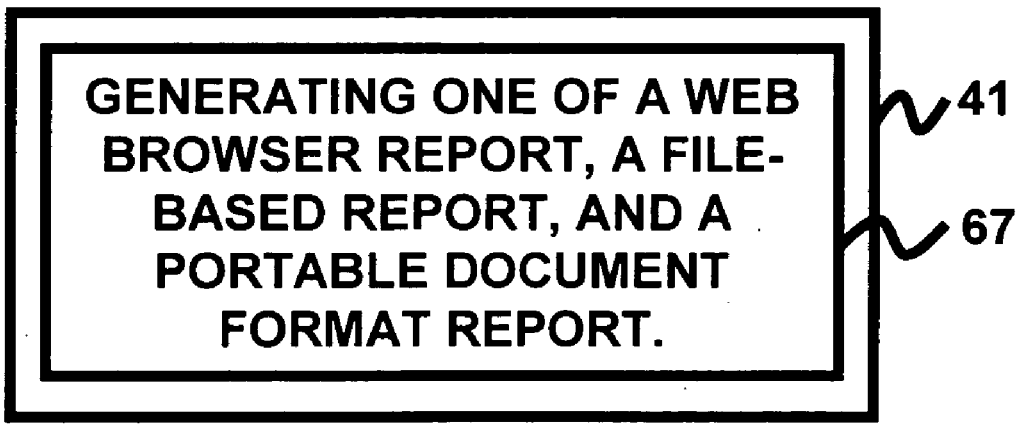
FIG. 11 is a flow diagram illustrating a preferred method of the present invention.
Figure 12:
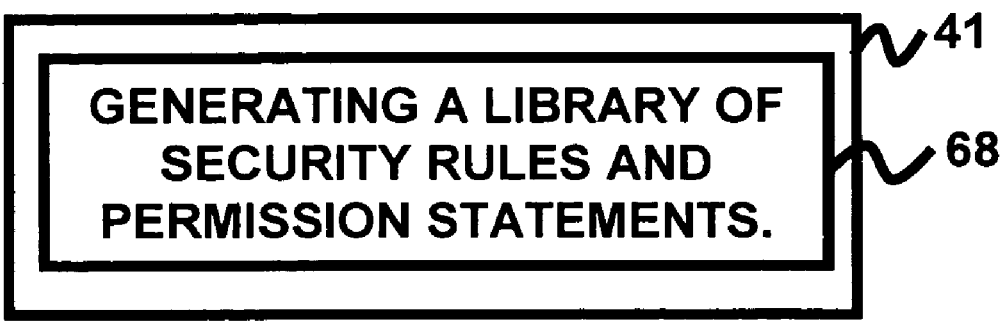
FIG. 12 is a flow diagram illustrating a preferred method of the present invention.
Figure 13:
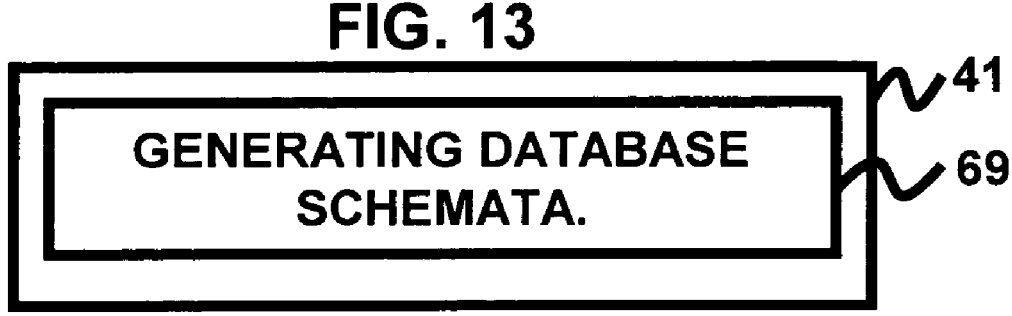
FIG. 13 is a flow diagram illustrating a preferred method of the present invention.

Additionally, as illustrated in the flow diagram of FIG. 11, the step of providing 41 a set of keywords and attributes 21 comprises generating 67 one of a web browser report 59, a file-based report 60, and a portable document format report 61 (all shown in FIG. 2), wherein the method enables an operator 38 to describe database interface components 71 by displaying data 37 to a user 38 (all shown in FIG. 6). Also, as seen in the flow diagram of FIG. 12, the step of providing 41 a set of keywords and attributes 21 comprises generating 68 a library of security rules 62 and permission statements 63 (shown in FIG. 2), wherein the method enables an operator 38 to describe authorization and authentication components 72 of an application. Finally, as illustrated in the flow diagram of FIG. 13, the step of providing 41 a set of keywords and attributes 21 comprises generating 69 database schemata 64 (shown in FIG. 2), wherein the database schemata 64 comprises data types 33, table types 34, tables 35, and enumerations 36, wherein the method enables an operator 38 to describe database structure components 73 by storing application data 37.

A representative hardware environment for practicing the present invention is depicted in FIG. 14 which illustrates a typical hardware configuration of an information handling/computer system 1 in accordance with the present invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 103, microphone 104, and/or other user interface devices such as a touch screen device (not shown) to bus 12, communication adapter 105 for connecting the information handling system to a data processing network, and display adapter 101 for connecting bus 12 to display device 102. A program storage device readable by the disk or tape units is used to load the instructions, which operate the invention, which is loaded onto the computer system 1.

According to the present invention, the extensible application framework 22 represents a library comprising a plurality of reusable classes that simplify the development and deployment of small-, medium-, and large-scale thin client, browser-based, data-driven, dynamic web applications. There are several characteristics of the extensible application framework 22 including coded resources. Here, the extensible application framework 22 specifications are performed, preferably using XML, including all dialogs, fields, validation rules, some conditional processing, all structured query language statements, dynamic query language statements, configuration files, and several other resources, which are preferably stored in XML files that are reusable across various applications. Although XML is the preferred method for creating resource files, those skilled in the art would readily appreciate that anything that can be specified in XML can also be specified using other types of code, such as a Java application programming interface.

Another feature of the extensible application framework 22, according to the present invention, are the executable specifications 20, wherein the majority of the extensible application framework 22 features including dialogs, structured query language statements, dynamic query rules, and schema definitions are performed using the executable specifications 20. These executable specifications 20 provide that most of the applications' resources double as both executable code and specifications, which can be extracted and automatically documented. Therein, the same resource acts as the documentation and the testable application.

Still another feature of the extensible application framework 22 includes value sources, which provide dynamic access to common business logic and may be considered a business rules library, according to the present invention. Many of the classes in the extensible application framework 22 use value sources, which are simply coded language, such as Java classes that follow a specific interface, to provide values for captions, defaults, comparisons, conditionals, and many other types of variables. Value sources allow common business logic to be stored in reusable classes and then used either in coded language, preferably XML or Java, files where necessary. Value sources can be either single or multiple and are used in dialogs, fields, structured query language statements, and many other places where dynamic data is required. The format of a value source is similar to that of a Uniform Resource Locator (URL).

According to the present invention, the extensible application framework 22 also provides for centralized configuration, whereby the extensible application framework 22 preferably favors XML storage of properties over using Java properties files. One of the configuration classes allows multiple properties to be defined in preferably a single XML file, complete with variable replacements, and these configuration classes provide the ability to create single-property or multiple property items. Alternatively, any property name could refer to value sources as part of the definition of a property so that the value of a property can become dynamic and be computed each time the property is used (in case the value of the property is based on a servlet request or session variable or some other application-defined business rule).

The extensible application framework 22 also provides for advanced forms/dialogs, wherein the extensible application framework 22 refers to hypertext markup language (HTML) forms as dialogs because it handles the two-way interaction between browsers and users completely, according to the present invention. This includes data persistence, data validation, a sophisticated client-side JavaScript library and user interface skins. Dialogs may also be defined in XML, completely in Java, or in a combination of the two. Even in XML, the entire Dialog including labels, captions, validation logic, conditional displays, and other advanced user interface features can be easily defined. Preferably, by keeping the entire definition in XML, non-programmers or junior engineers can create forms and more experienced developers can attach business logic as appropriate.

Next, according to the present invention, the extensible application framework 22 provides powerful datasources and database connectivity and aggregation services. Here, starting with a simple interface to one or more database connection and pooling engines and including such features as dynamic data source definitions and selection, the database connectivity support sets the stage for both static and dynamic structured query language libraries and pooled/cached result sets.

Moreover, according to the present invention, the extensible application framework 22 also provides JSP (Java Server Pages) custom tags and Java classes to automatically create structured query language insert/update/remove data manipulation language (DML) commands. By providing simple name/value pairs of data, the extensible application framework 22 automatically generates complex DML statements.

Furthermore, according to the present invention, the extensible application framework 22 includes structured query language libraries. Here, in order to encourage reusability and encapsulation and reduce the amount of time spent creating "data beans", the extensible application framework 22 allows all SQL statements and dynamic parameters used in a project to be specified in one or more SQL files. Once defined, a single or multiple SQL statement may be used in reports, dialogs (forms), servlets, or JSP-pages. Preferably, SQL statement pooling completely replaces simple data-serving beans since data objects are automatically created for all SQL statements. Moreover, data can be easily aggregated from multiple data sources because each SQL statement in the statement pool can be specified (either XML or JSP) to come from a variety of pre-defined or dynamic data sources.

Additionally, according to the present invention, the extensible application framework 22 uses dynamic queries to define tables, columns, joins, sort orders, and other important data through the use of Meta Information about data relationships. Once a developer creates a query definition, the extensible application framework 22 allows end-users to use simple HTML-based forms to automatically generate SQL accurate and performance-tuned statements to create paged reports or export data to external sources.

According to the present invention, the extensible application framework 22 also creates reports, which are preferably completely defined in XML. This includes headings, banners, column types, calculations, grouping, sort order, etc. By keeping the entire definition in XML, non-programmers or junior engineers can create report definitions and more experienced developers can attach business logic. The extensible application framework 22 also separates form/report presentation from form/report design and logic by automatically creating all HTML and DHTML (Dynamic HTML) in user-defined "skin" objects. The skins perform all drawing operations while the report/form objects manage all of the fields and validation. Skins provide the ability to design and describe a dialog once and execute it on mobile, small form-factors (handheld computers), notebook computers, and desktop computers, or to different formats like PDF, comma-separated, and tab-delimited.

There are several benefits of the present invention. First, the present invention provides an automated system and method for performing reusable software application development. Second, the present invention provides a business-oriented computer software system comprising multi-components or facets including forms, dialogs, fields, validation rules, static structured query language statements, dynamic structured query language statements, security roles and permissions, value sources, data sources, database schemata, reports, navigation, and personalization. Another benefit of the present invention is that it provides a unified system of processing, testing, and documenting these facets.

Yet another benefit of the present invention is that it provides a computer system and method for automatically generating and processing software code, object instantiations, testable functionality, and implementation documentation from a single set of declarative executable specifications. Still another benefit of the present invention is that it provides a computer system that allows a software application developer the ability to declare a single set of executable specifications and receive full unit tests, implementation documentation, and end-user application code from the set of specifications. Another benefit of the present invention is that it provides a computer system for performing software application development that allows the executable specifications to be reused across several projects.

Moreover, another benefit of the present invention is that it provides a computer system and methodology which allows application developers to spend time on real features significant to end-users instead of infrastructure issues that are important only to programmers. Furthermore, another benefit of the present invention is that it provides a computer system whereby technical managers can better manage their application development projects by utilizing built-in project management, application documentation, unit-testing, and artifact-generation tools. Additionally, another benefit of the present invention is that most of the user interface and database logic is coded in a declarative style using XML code instead of a programmatic style using Java code, wherein this significantly reduces the amount of code (as much as 50–75% of code can be eliminated), increases reusability of the code, and increases code quality.

Yet another benefit of the present invention is that it provides a computer system, wherein analysts can use the declarative user interface features to create prototypes that can later be completed by programmers, thereby resulting in no more throw-away prototypes, as is common with conventional systems. Still another benefit of the present invention is that it provides a computer system, wherein applications are built by assembling declared user interface (UI) forms/dialogs and database SQL components combined with application-specific business logic using single or multiple distributed application tiers. Another benefit of the present invention is that it provides a feature-rich framework that significantly reduces the time, resources, and cost of producing reusable high-quality data-intensive thin-client applications.

Yet another benefit of the present invention is that it implements common design patterns like Model-View-Controller (MVC) and factories, and the present invention's skins infrastructure allows identical business logic to be used across different user interfaces for a variety of browsers and platforms like handheld computers. Still another benefit of the present invention is that it affords developers a lot of flexibility in their software application development process without having to change the existing code-base.

While the invention has been described in terms of preferred embodiments, those skilled in the art will recognize that the invention can be practiced with modification within the spirit and scope of the appended claims.

What is claimed is:

1. A computer system for performing reusable software application development, said computer system comprising a multi-component architecture comprising data, wherein said multi-component architecture further comprises:
   a relational database server operatively connected to an application server;
   a presentation component operatively connected to said application server;
   an application component operatively connected to said application server;
   a data component operatively connected to said application server;
   a security and personalization component operatively connected to said presentation component, said application component, and said data component;
   an administration console operatively connected to said presentation component, said application component, and said data component, wherein said administration console comprises said security and personalization component, and wherein said security and personalization component restricts access to said data; and
   declarable executable specifications operatively connected to said security and personalization component, wherein said declarable executable specifications comprise a set of keywords and attributes used to declare a single set of said executable specifications and receive full unit tests, implementation documentation, and end-user application code from said single set of said executable specifications.

2. The computer system of claim 1, wherein said presentation component comprises an extensible application framework comprising at least one application program interface, wherein said application program interface automates form building engines, data state machine engines, queries engines, reporting engines, access control engines, templating engines, project configuration engines, rule processing engines, and metrics engines.

3. The computer system of claim 1, wherein said application component comprises an extensible information framework of database structure libraries, wherein said libraries comprise reusable tables, columns, and indexes.

4. The computer system of claim 1, wherein said data component creates a plurality of database object classes, and wherein said data component comprises data types, table types, tables, and enumerations.

5. The computer system of claim 1, wherein said administration console responds to operator commands enabling an operator to access said data and said declarable executable specifications.

6. A computer-implemented method for performing reusable software application development, said method comprising:
   integrating a data processing system;
   providing a set of keywords and attributes in said data processing system;
   declaring a single set of executable specifications using said set of keywords and attributes; and
   receiving full unit tests, implementation documentation, and end-user application code from said single set of said executable specifications.

7. The method of claim 6, wherein said step of declaring a set of executable specifications comprises:
   generating a program code in said data processing system;
   instantiating an object code in said data processing system;
   generating a testable functionality result in said data processing system;
   generating at least one unit test case in said data processing system;
   generating implementation documentation output in said data processing system;
   generating a performance statistics output in said data processing system; and
   generating a project metrics in said data processing system.

8. The method of claim 6, wherein said step of providing a set of keywords and attributes comprises generating a set of user interface forms, fields, and validation rules, and wherein said method enables an operator to describe components of a presentation and interface by receiving input from a user.

9. The method of claim 6, wherein said step of providing a set of keywords and attributes comprises:
   generating a library of structured query language statements; and
   generating a library of rules for generating dynamic structured query language statements,
   wherein said method enables an operator to describe database access components by retrieving data from a data storage device,
   wherein said data storage device is coupled to said data processing system, and
   wherein said method enables said operator to describe database access rules and user interface components that connect to said data storage device by retrieving said data from said storage device and presenting data to a user.

10. The method of claim 6, wherein said step of providing a set of keywords and attributes comprises generating one of a web browser report, a file-based report, and a portable document format report, and wherein said method enables an operator to describe database interface components by displaying data to a user.

11. The method of claim 6, wherein said step of providing a set of keywords and attributes comprises generating a library of security rules and permission statements, and wherein said method enables an operator to describe authorization and authentication components of an application.

12. The method of claim 6, wherein said step of providing a set of keywords and attributes comprises generating database schemata, wherein said database schemata comprises data types, table types, tables, and enumerations, and wherein said method enables an operator to describe database structure components by storing application data.

13. A program storage device readable by machine, tangibly embodying a program of instructions executable by said machine to perform a method for performing reusable software application development, said method comprising:
integrating a data processing system;
providing a set of keywords and attributes in said data processing system;
declaring a single set of executable specifications using said set of keywords and attributes; and
receiving full unit tests, implementation documentation, and end-user application code from said single set of said executable specifications.

14. The program storage device of claim 13, wherein said step of declaring a set of executable specifications comprises:
generating a program code in said data processing system;
instantiating an object code in said data processing system;
generating a testable functionality result in said data processing system;
generating at least one unit test case in said data processing system;
generating implementation documentation output in said data processing system;
generating a performance statistics output in said data processing system; and
generating a project metrics in said data processing system.

15. The program storage device of claim 13, wherein said step of providing a set of keywords and attributes comprises generating a set of user interface forms, fields, and validation rules, and wherein said method enables an operator to describe components of a presentation and interface by receiving input from a user.

16. The program storage device of claim 13, wherein said step of providing a set of keywords and attributes comprises:
generating a library of structured query language statements; and
generating a library of rules for generating dynamic structured query language statements,
wherein said method enables an operator to describe database access components by retrieving data from a data storage device,
wherein said data storage device is coupled to said data processing system, and
wherein said method enables said operator to describe database access rules and user interface components that connect to said data storage device by retrieving said data from said storage device and presenting data to a user.

17. The program storage device of claim 13, wherein said step of providing a set of keywords and attributes comprises generating one of a web browser report, a file-based report, and a portable document format report, and wherein said method enables an operator to describe database interface components by displaying data to a user.

18. The program storage device of claim 13, wherein said step of providing a set of keywords and attributes comprises generating a library of security rules and permission statements, and wherein said method enables an operator to describe authorization and authentication components of an application.

19. The program storage device of claim 13, wherein said step of providing a set of keywords and attributes comprises generating database schemata, wherein said database schemata comprises data types, table types, tables, and enumerations, and wherein said method enables an operator to describe database structure components by storing application data.

* * * * *